Sept. 10, 1968  A. K. LITTWIN  3,401,313
APPARATUS AND METHOD FOR CONTROLLING MAGNETISM
Filed Dec. 20, 1965  2 Sheets-Sheet 2
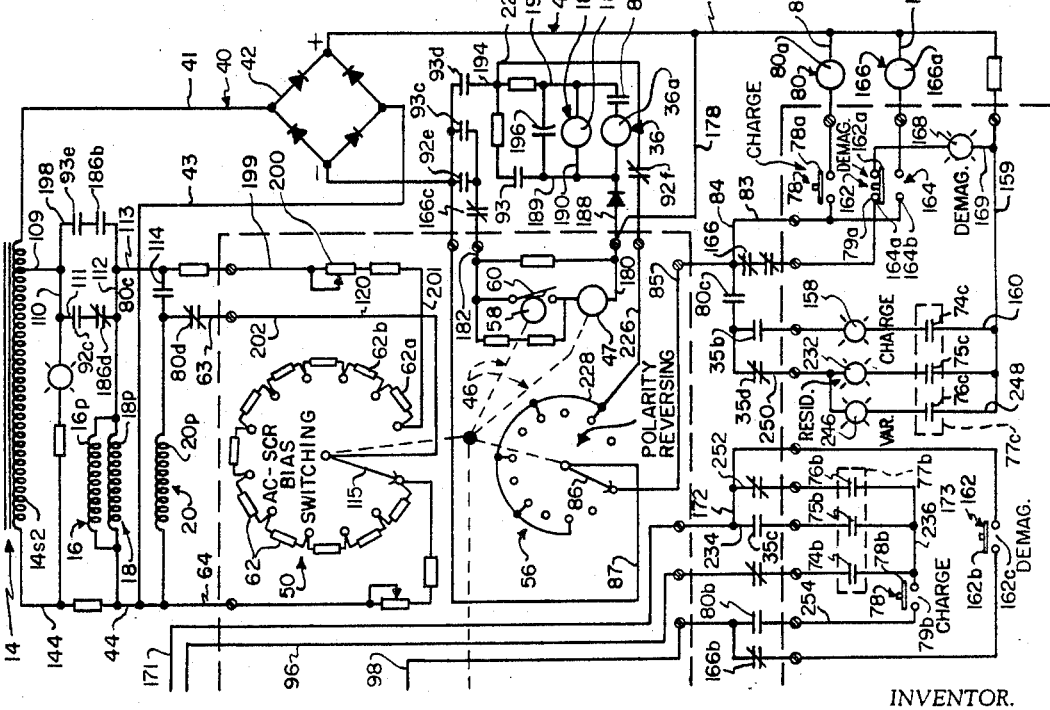

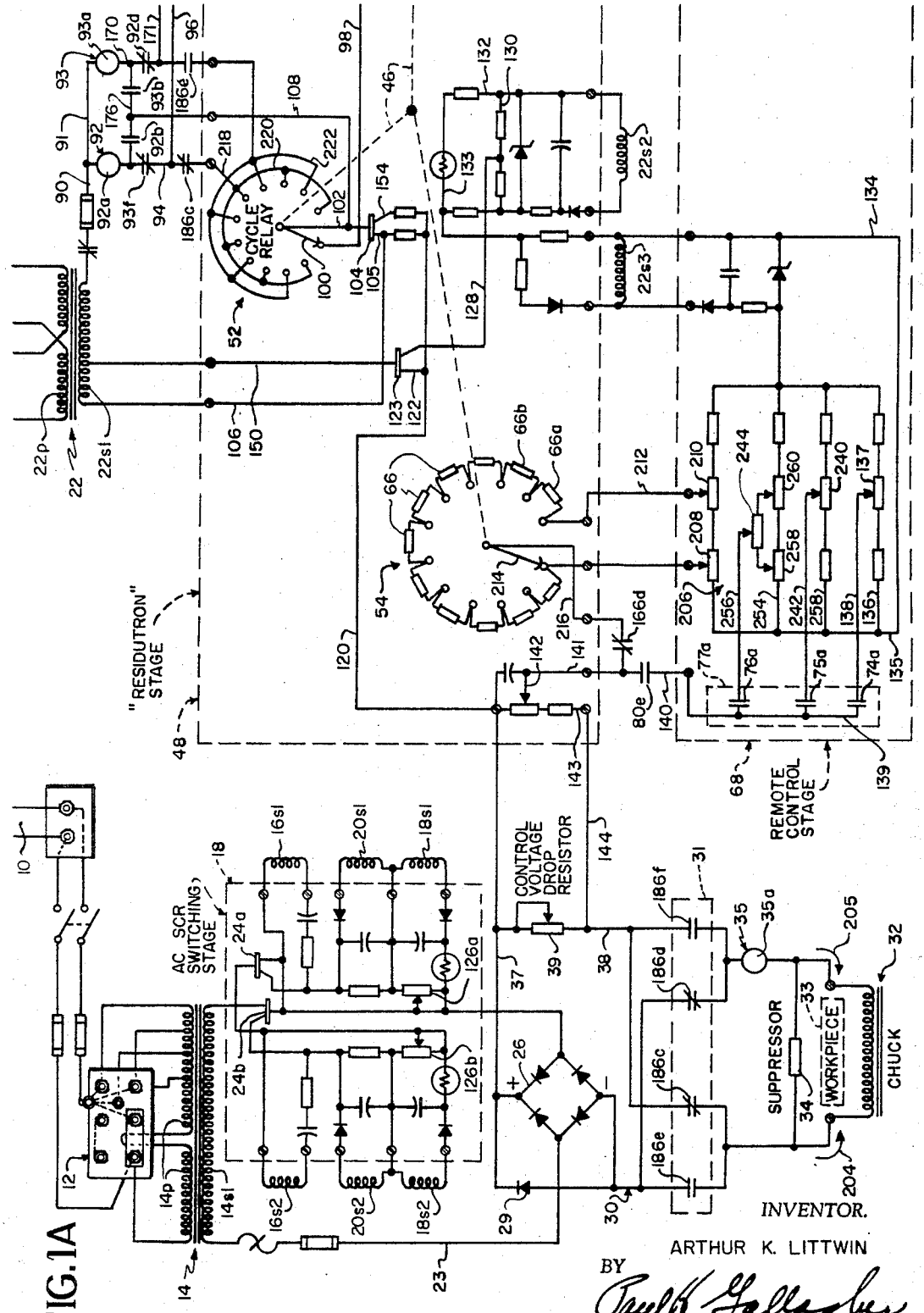

United States Patent Office 3,401,313
Patented Sept. 10, 1968

3,401,313
APPARATUS AND METHOD FOR CONTROLLING MAGNETISM
Arthur K. Littwin, Lincolnwood, Ill., assignor to Arthur K. Littwin, Robert L. Littwin, Donald F. Littwin and Horace A. Young, Chicago, Ill., as trustees, known as Littwin Family Trust No. 1
Filed Dec. 20, 1965, Ser. No. 515,037
29 Claims. (Cl. 317—157.5)

The present invention relates to apparatus and method for controlling the magnetizing and demagnetizing of an article.

The invention has particular adaptation to the industrial field, being used quite often for example in connection with a machine tool in the use of which a workpiece is treated, and the workpiece is held in place on a magnetic chuck while being worked upon by the machine tool. When it is desired to remove the workpiece after the working operation is performed thereon, the magnetic chuck and the workpiece must of course be demagnetized, whether the chuck is of non-permanent electromagnetic type or of permanent magnet type as in the preferred form of the present invention. In either case the chuck and workpiece must be substantially completely demagnetized in order to remove the workpiece from the chuck, but there are a number of other control operations that must be performed on the chuck and workpiece in the normal use of the machine tool. Such additional steps may be for example initially energizing or charging the chuck and workpiece and demagnetizing them, or partially so, and bringing them to conditions that are known as "Residual" and "Variable."

A broad object of the present invention is to provide novel apparatus and method of the foregoing general character which are particularly effective for performing all of the foregoing steps and otherwise controlling the magnetizing and demagnetizing of an article.

An important advantage of the invention resides in its effectiveness in demagnetizing and otherwise controlling an article regardless of the mass of the article or other characteristics as would require different treatment for complete demagnetizing, whereby regardless of the character of the workpiece, held by the chuck, the apparatus will be effective for performing the demagnetizing operation and other control operations and the apparatus will be automatically effective for use in connection with a plurality of workpieces successively without requiring adjustment according to the character of the successive workpieces.

Another and broad object of the invention is to provide apparatus and method of the foregoing general character in which the applied voltage is reduced in steps in a demagnetizing operation, and the current applied to the article to be demagnetized is also reduced in those steps.

Still another object is to provide apparatus and method of the character just referred to, in which the steps in the demagnetizing operation are controlled by the condition of the article being demagnetized.

A still further object is to provide apparatus and method of the character just referred to in the use of which, because of the reduced current in the successive steps, greater accuracy of control of the demagnetizing operation can be achieved.

An additional object is to provide apparatus and method of the foregoing general character capable of performing a plurality of operations including demagnetizing, in which extreme flexibility is provided for conditioning the apparatus for performing any of the operations or steps, selectively.

Still another object of the invention is to provide new magnetizing and demagnetizing apparatus involving an electrically magnetizable and demagnetizable permanent magnet chuck wherein the apparatus may be used for magnetizing the chuck and then shut off, whereupon the chuck is fully effective for performing its intended function without continuing control by the apparatus, whereby the chuck continues to maintain its holding power after the control apparatus has been shut off.

A further object is to provide apparatus of the foregoing general character in the use of which the chuck can be demagnetized to a greater degree of accuracy, than has been possible heretofore.

Other objects and advantages of the invention will appear from the following detail description taken in conjunction with the accompanying drawings in which:

FIGURES 1A, 1B together are a diagram of a circuit utilized in the apparatus;
FIGURE 2 is a view of a control panel;
FIGURE 3 is a diagrammatic illustration of one of the switch means used in the circuit;
FIGURE 4 is a diagrammatic illustration of one of the push button control switches;
FIGURE 5 is a diagrammatic illustration of another push button control switch.

In the following description of the diagram of FIGURES 1A and 1B, the references to the different locations in the circuit are related to the two portions of the circuit as being together in a single figure. In that circuit, an AC supply source is indicated at 10 leading to a voltage value selecting panel 12 and then to a transformer indicated generally at 14 having a primary 14p and a plurality of secondaries 14s, individually identified by additional numerals, one of the secondaries, 14s1, being shown adjacent the primary. The panel 12 enables selective values of voltages in the transformer 14 according to the various applications to which the apparatus is to be put.

The transformer 14 includes another secondary 14s2 (top right) in turn controlling other transformers 16, 18 and 20, having primaries 16p, 18p, and 20p respectively, and secondaries (upper left) 16s1, 16s2, 18s1, 18s2, and 20s1, 20s2, all of which will be referred to again hereinbelow.

The apparatus includes another transformer 22 (top center) having a primary 22p connected with the source 10 through the panel 12 and a secondary 22s1 shown immediately adjacent thereto, and other secondaries (lower center) 22s2 and 22s3.

The secondary 14s1 is included in an AC circuit 23, which also includes back-to-back gates 24a and 24b (SCR's—silicon control rectifiers), and a bridge rectifier 26. The gates 24a, 24b are incorporated in an AC-SCR SWITCHING STAGE indicated by the dotted rectangular line 28 together with other instrumentalities under the control of the secondaries of the transformers 16, 18, and 20, as will be referred to again hereinbelow.

Leading from the rectifier 26 is a DC circuit 30 including a set of reversing switches indicated in a group at 31 which will be individually identified and described later. The DC circuit 30 includes an electrically controlled permanent magnet chuck 32 which together with a workpiece 33 associated therewith constitute the article of which the magnetizing and demagnetizing is to be controlled. Preferably a suppressor 34 is connected across the chuck.

The permanent magnet of the chuck 32 at normal conditions is operative for magnetically retaining the workpiece 33 thereon. The apparatus is operative for substantially completely demagnetizing the permanent magnet, for releasing the workpiece and to again magnetize it, in the same polarity or opposite polarity selectively. These steps in the control of the permanent magnet chuck will be referred to again hereinbelow.

The chuck may be incorporated in any of various kinds of machine tools, such for example, as shown in my prior patent, Re. 25,607 issued June 30, 1964, where the chuck, identified at 16 is incorporated in a table 12 and holds a workpiece 17 thereon. The workpiece is held in position on the table for operation thereon by a tool such as a grinding wheel 18. When the operation is completed on the workpiece, the chuck and the workpiece must be demagnetized, for which the apparatus of the present invention is adapted. The apparatus is also adapted to perform other functions as indicated above and as will be described hereinbelow.

In the use of the chuck 32 in the present apparatus it will be understood that the current for energizing the permanent magnet need not be constantly turned on, because after the permanent magnet is magnetized, it becomes fully effective without continuous energizing current. This feature also will be recognized as an advantage in use of the apparatus in that if the power should fail, the chuck will remain fully effective for holding the workpiece thereon.

A latching relay 35 has a coil 35a in series with the chuck and contacts identified hereinbelow, bearing the same reference numeral with different subscript letters. The various relays herein, and their components, will be similarly identified. This relay 35 is of known kind and when energized, latches in pulled-in position and remains in such condition until later unlatched by another control. Such control is exercised by another relay 36 (right center) which when energized, prevents the coil 35a from pulling in. The relay 36 includes a coil 36a and a series of contacts identified hereinbelow. Referring again to DC circuit 30 containing the chuck (bottom left), this circuit includes conductors 37 and 38 across which is an adjustable voltage drop control resistor 39 to be referred to again hereinbelow.

The transformer secondary 14s2 (top right) leads through an AC circuit 40 including a conductor 41, to a bridge rectifier 42 and including return conductors 43 and 44. A DC circuit 45 leads from the rectifier for controlling various instrumentalities, one of which is a stepping switch assembly 46 (right center) which includes a rotor 47 in the DC circuit. The stepping switch assembly 46 together with other elements are incorporated in what is identified as a "RESIDUTRON" STAGE 48 (center, enclosed in dotted lines). ("Residutron" is a registered trademark of Electro-Matic Products Company of Chicago.)

The stepping switch assembly 46 includes stepping switches 50, 52, 54, and 56, and a cam 58, all rotated in unison by the rotor 46, the cam 58 serving to open a switch 60 to the rotor 47 at each step, for terminating the rotation thereof. The stepping switch assembly may be of any desired and known kind wherein upon each energization of the rotor 47, it advances the various switches one step and the rotor is then moved to retracted position while the switches remain in advanced position. The stepping switches include, in the present instance, twelve positions although a different number of positions may be utilized, according to circumstances in different installations. All of these switches are shown in their OFF or home positions and they are advanced simultaneously step by step through the twelve steps, and continuing in the same direction to OFF position in the normal operation of the apparatus. The switches 50, 52, and 54 are of the bridging or shorting type, bridging two contacts in the stepping operation, while the switch 56 is of non-shorting type.

The switch 50 includes a plurality of resistors 62 in series, being connected through conductors 63 and 64 with the primary 20p and operates to control the effective voltage of that primary and the secondaries 20s1 and 20s2 (upper left). Specifically in the stepping operation of the switch 50 a successively greater number of resistors are put in circuit, reducing the current through the primary 20p and thus through the secondaries 20s1 and 20s2, which in turn reduce the current applied on the chuck 34 as will be described hereinbelow.

The switch 52 is a reversing switch connected with the secondary 22s1 (top center) the function of which will be described hereinbelow.

The switch 54 also includes a plurality of series resistors 66, which upon stepping of the switch, are placed in circuit in successively greater numbers similarly to the switch 50.

The switch 56 includes a plurality of alternate contacts connected in parallel, the remaining ones of which are blank. The switch 56 controls the reversing of the polarity of the DC applied to the chuck 32 in the demagnetizing operation.

The demagnetizing operation involves the reduction of the DC applied to the chuck in a series of steps, and reversing the polarity thereof successively in those steps, the voltage being of such a low value in the final step that the residual magnetism remaining in the chuck is at a value very close to zero, enabling the workpiece to be readily removed from the chuck. This broad concept of demagnetizing is known, being covered for example by L. F. Littwin Patent No. 2,229,104 dated Jan. 21, 1941, and by my re-issue patent referred to above, the latter covering broadly the concept of utilizing an AC source and applying rectified DC on the chuck. The present apparatus accomplishes all that was accomplished by the apparatus of the foregoing two patents, in addition to having other advantages, a principal one of which is the control of the current applied to the chuck in the various steps so that the current is held at a steady value throughout the interval of each step, and each step is initiated by the condition of the chuck.

The circuit includes also a REMOTE CONTROL STAGE identified in its entirety at 68 (bottom, enclosed in dotted lines). This stage includes various switches, resistors, etc. which will be individually referred to in the description of the operation of the apparatus.

As indicated above, the apparatus of the invention is utilized for completely controlling the condition of the chuck 32, i.e., not only does it control the demagnetizing thereof, but also the magnetizing or "charging" thereof. The circuit as represented in FIGURES 1A and 1B is in OFF condition, and to magnetize or charge the chuck, the circuit is put in CHARGE condition, a first step of which is to set the knob 70 (FIGURE 2) in CHARGE position, if it is not already in that position. The knob is incorporated in a selector switch indicated in its entirety at 71 (FIGURE 3) and controls an arm 72 having a plurality of, in this case three, contactor bars 73 for selectively controlling the same number of selector switches 74, 75, and 76, these switches being found also in the REMOTE CONTROL STAGE (bottom, FIGURES 1A and 1B). The knob 70 when in its central position effects closing of the switches 74 which in the assumed example closes all of the switches 74, namely 74a, 74b, and 74c. The switches of the three groups 74, 75, and 76 are also arranged in transversely divided groups namely 77a, 77b, and 77c (FIGURE 3), these groups also being found in the REMOTE CONTROL STAGE. One of each of the groups of switches 74, 75, and 76 will be found in each of the transverse groups 77a, 77b, and 77c. Upon placing the knob 70 in the CHARGE position, all of the switches 74a, 74b, and 74c are closed.

The next step in the CHARGE operation is to depress the push button 78 (FIGURES 2 and 4) which in the circuit of FIGURES 1A and 1B is indicated diagrammatically in two parts, 78a and 78b (bottom right). Upon depression of this push button the switches 79a and 79b are closed, energizing a latching relay 80 having a coil 80a in series with the switch 79a. The coil remains in latched condition after release of the push button until unlatched in a later step in a known manner and as referred to below. Energization of the coil 80a actuates a series of contacts which remain closed or open, until the relay is unlatched.

Upon depression of the push button 78, a DC circuit is completed through the rectifier 42 as follows: conductors 81 and 82, the CHARGE switch 79a, conductors 83, 84, and 85, the arm 86 of the switch 56, and conductors 87 and 88.

Upon closure of the contacts 80b (lower right) pursuant to depression of the push button 78, a circuit is completed through the transformer 22s1 (top center) as follows: conductor 90, the coil 92a of a relay 92, conductors 94 and 96, contacts 74b, the CHARGE switch 79, abnormally closed contacts 80b, conductor 98, arm 100 of the stepping switch 52, conductor 102, gate (SCR) 104, and conductor 105 and 106, in return to the transformer. The gate 104 is normally conducting and is rendered nonconducting by the condition of magnetism of the chuck 32 as will be explained hereinbelow. Energization of the coil 92a closes contacts 92b which establishes a holding circuit through conductor 108 which then connects with conductor 102 and through gate 104 with conductors 105 and 106 to the transformer. The relay 92 is utilized not only in magnetizing or charging the chuck but also in demagnetizing it and in connection with the latter function is closely associated with another relay 93 (top center), the latter relay being also utilized in other functions as to be described hereinbelow.

The relay 92 also includes contacts 92c (top right) establishing circuit between the secondary 14s2 and the transformer 20 for energizing the latter as follows: conductors 109, 110, and 111, contacts 92c, conductors 112, 113, 114, abnormally closed contacts 80c, the transformer 20, and conductor 44 in return to the secondary 14s2.

Another circuit is connected through and energized by the transformer 20 as follows: conductor 63, the arm 115 of the switch 50, and the conductor 64. The switch 50 being in OFF position as this step, the resistors 62 are bypassed, with consequent maximum voltage in the transformer 20. Corresponding maximum current is set up in secondaries 20s1 and 20s2 (upper left) which impose maximum bias on the gates 24a and 24b. As a consequence, the AC circuit 23 is rendered conducting and maximum current from the transformer 14 flows therethrough, with corresponding maximum DC in the circuit 30 to the chuck 32. The chuck then becomes fully magnetized or charged for performing the desired holding operation on the workpiece, and the apparatus remains in that condition until further manual control steps are taken to alter its condition. The stepping switch assembly 46 also remains stationary and inactive with all stages thereof in OFF position.

Upon build-up of the magnetism of the chuck and corresponding voltage across the voltage drop control resistor 39, such control voltage is utilized for de-energizing the relay coil 92a (top center) and stabilizing the circuit. The control resistor 39 (left center) is set manually in a setting corresponding to the circumstances of the installation through a circuit as follows: from the conductor 37 to conductors 120 and 122 to a gate (SCR) 123, then through conductors 128, 130, 132, 133, 134, 135, 136, 138, the contacts 74a then closed by the setting of the knob 70, conductors 139, 140, abnormally closed contacts 80d, conductors 141, 142, 143, and 144 in return to the conductor 38. This circuit just identified imposes a bias on the gate 123 and renders it nonconducting. The gate 123 is connected in circuit through a conductor 150 to an intermediate tapping of the secondary 22s1, where a portion 152 thereof is also connected with the conductor 106. The nonconducting condition of the gate 123 thus established renders the rate 104 nonconducting, the control being from the segment 152 of the secondary 22s1, through conductors 106 and 105, the gate 104, conductors 154 and 156, in return through the conductor 122, gate 123 and conductor 150. Thus the circuit through the relay coil 92a is interrupted and that coil is de-energized.

De-energization of the coil 92a results in opening the contacts 92c (top right), de-energizing the transformer primary 20p and the secondaries 20s1 and 20s2 (upper left) and renders the gates 24a and 24b nonconducting and opens the AC circuit 23 and the DC circuit 30. However the chuck remains energized by reason of the permanent magnet therein as described above.

During the course of the control of the gates 24a and 24b by the secondaries 20s1 and 20s2, the secondaries 16s1, 16s2 and 18s1, 18s2 are energized, because the contacts 92c (top right) are closed and establish a circuit through the primaries 16p and 18p. The secondaries 18s1 and 18s2 impose negative DC bias on the gates, this bias being adjustable according to the settings of the adjustable resistors 126a and 126b which however remain in set position during a given cycle of operation of the apparatus. The secondaries 16s1 and 16s2 also provide negative bias on the gates 24a and 24b and in this case also this bias is fixed. The positive bias on the gates provided by the secondaries 20s1 and 20s2 is varied under the control of the stepping switch 50 in the demagnetizing operation so as to impose successively less voltage on the chuck in the succeeding steps in the demagnetizing operation, as explained hereinbelow.

In the condition of magnetization of the chuck as described above, and consequent energization of the relay coil 35a (bottom left) the contacts 35b (lower right) are closed establishing a circuit through a green indicating lamp 158 from the rectifier 42 (upper right) through conductors 81 (far right), 159 and 160, contacts 74c, abnormally closed contacts 80c, conductors 161 and 85, arm 86 of the switch 56, and conductors 87 and 88 in return to the rectifier.

The description above concerning the magnetizing or CHARGE condition of the circuit, makes reference to the greatest value of the current being imposed on the chuck. This same condition exists in the beginning of the demagnetizing operation, i.e., it is not changed until the first demagnetizing step has actually been performed.

When it is desired to demagnetize the chuck after the operation is performed on the workpiece, such as by grinding it, the operator depresses the pushbutton 162 (FIGURES 2 and 5), represented in the circuit of FIGURES 1A and 1B by two parts 162a and 162b (bottom right) which controls a plurality of switches 164, the contacts 164a being closed when the pushbutton is in retracted position and the contacts 164b and 164c being closed when the pushbutton is depressed. Upon depression of that pushbutton, an unlatching relay 166 (bottom right), is energized which de-energizes the latching relay 80 permitting the contacts of that relay all to assume their normal positions. The circuit through the relay 166 derives from the rectifier 24 (upper right) through conductors 81, 167, contacts 164b, conductors 83, 84, 85, the arm 86 of the switch 56, and conductors 87 and 88 in return to the rectifier.

A signal light 168 (bottom, right) is interposed in a conductor 169 in series with the demagnetizing switch 164 and is energized at certain times as explained hereinbelow.

In the demagnetizing operation, depression of the pushbutton 162c (lower right) and energization of the relay 166 unlatches relay 80 and the various contacts thereof assume their normal positions. Closure of the switch 164c (bottom right) establishes a circuit for energizing the relay 93 (top center) from the transformer 22s1 through conductor 90, the relay 93 conductor 170, contacts 92d, conductors 171, 172, 173, the contacts 164c, conductor 174, contacts 166b, conductor 98, the arm 100 of the switch 52, conductor 102, gate 104, conductors 105 and 106 in return to the transformer 22s1. The relay 93 includes contacts 93b (top center) establishing a holding circuit through the conductors 176 and 108.

Upon energization of the relay 93 contacts 93c (center right) are closed, establishing a circuit through the stepping switch rotor 47 as follows: conductors 81, 178, and 180 to the rotor, then through the switch 60, conductor 182, the contacts 166c and 93c, and conductors 184 and 88 in return to the rectifier 42. Energization of the rotor 47 steps each of the stepping switches 50, 52, 54, 56 to its No. 1 position.

Energization of the relay 93 additionally closes contacts 93d (center right) which closes contacts through a relay 186 (center right), from the rectifier 42 as follows: conductors 81, 178, 188, 189, 190, 192, 194, 184, and 88 in return to the rectifier. Connected across the relay 186 is a capacitor 196 which provides delayed action of the relay.

Additionally, upon energization of the relay 93 (top center), contacts 93e (top right) are closed, and upon energization of the relay 186 (center right) after the time delay, the contacts 186b of that relay are closed (top right); the circuit is again established through the transformer primary 20p as follows: the transformer secondary 14s2, conductors 109, and 198, the contacts 93e and 186b conductors 113, 199, 201 to contact No. 1 of the switch 50. The circuit then continues through the arm 115 of the switch (which is then in No. 1 position), conductors 63 and 114 through the primary 20p and conductor 44 in return to the secondary 14s2. The switch 50 is at high position for flow of maximum current. This energization of the primary 20p again energizes the secondaries 20s1 and 20s2 (upper left) which render the gates 24a and 24b conducting, thus closing the AC circuit 23. The DC circuit 30 is also closed but in reverse-polarity direction relative to the previous closure; the reversing switches 31 identified above are controlled by the relay coil 186a (center right) and the polarity of the DC imposed on the chuck is reversed in each successive step in response to alternate energization and de-energization of that relay coil. The reversing switches 31 include normally closed contacts 186c and 186d and normally open contacts 186e and 186f. In deenergized condition of the coil, the DC flows through the normally closed contacts in a first direction as indicated by the arrow 204, and when energized it flows therethrough in the opposite direction or that indicated by the arrow 205. In the present step of the demagnetizing operation, namely upon energization of the relay 93 (top center) the chuck is again magnetized, in the opposite polarity from that of the original magnetization thereof, but of the same level of magnetization.

In the demagnetizing operation the switch 50 is stepped downwardly, which as viewed in FIGURE 1B is in counter clockwise direction. The arm 122 moves to the next contact in each step, and the voltage established by this switch is successively reduced in accordance with successive steps of the switch, namely at each step an additional one of the resistors 20 is put in circuit, which steps down the value of the voltage made effective through the switch. The current is accordingly reduced, which reduces the current in the secondaries 20s1 and 20s2 in corresponding steps with consequent reduction of the controlling current imposed on the gates 24a and 24b. As a result of this the current from the transformer 14, passing through the gates to the chuck, is reduced in steps. This reduction continues until that voltage and consequent current closely approach zero with the result that the chuck and workpiece are substantially demagnetized and the workpiece can be removed from the chuck.

The conductor 199 (upper right) includes an adjustable resistor 200 and is set in each demagnetizing operation at a value estimated to be about $\frac{1}{12}$ of the voltage of the transformer 200. The resistors 66 in the switch 50 are eleven in number and each of those represents approximately $\frac{1}{12}$ of the voltage of the transformer. Thus when the apparatus reaches its first step in the demagnetizing stage, the value of the voltage of the transformer 20 that is imposed on the control secondaries 20s1 and 20s2 (upper left) is reduced in value about $\frac{1}{12}$ and a corresponding control is exerted on the gates 24a and 24b whereupon a reduced current is imposed on the chuck and the chuck becomes magnetized at a slower rate than would be the case if full value current were imposed thereon.

Upon energization of the relay 93 (top center) in the first step of the demagnetizing operation, it remains energized until de-energized by the chuck as follows: a control signal is exerted by the chuck on the gate 123 (center) through the circuit including conductors 37, 120, 122, the gate 123, conductors 128, 130, 132, 133, 134, 135, 206, the last conductor including adjustable resistors 208 and 210 representing low and high values respectively in the demagnetizing operation; the circuit continues through the adjustable resistor 210, conductor 212, contact No. 1 of the switch 54 and the arm 214 of the switch which is at that time in engagement with that contact; then conductor 216 contacts 166d, conductors 141, 142, 143, and 144 in return to the conductor 38 of the chuck circuit. The control signal is produced in this circuit when the level of magnetism in the chuck has reached a predetermined value and the gate 123 (center) is cut off at a later time corresponding to the slower buildup of the magnetism in the chuck and the lesser final value thereof. The voltage drop across the adjustable resistor 210 (lower center) exerts a correspondingly lesser signal on the gate 123. When however the gate 123 is shut off, the relay 93 (top center) is de-energized. This opens the contacts 93e (top right) which de-energizes the transformer 20 and thus shuts off the transformer 14 (top left) and the magnetizing circuit to the chuck.

Additionally upon de-energization of the relay 93, the contacts 93d (center right) are de-energized which de-energizes the relay 186 (center right).

De-energization of the relays 93 (center top) and 186 (right center) set up the second step in the demagnetizing operation as follows: the contacts 93f and 186c (both immediately below the relay coil 92a) are closed; this sets up a circuit through the relay 92 from the secondary 22s1 as follows: conductors 90, 91, the relay, conductor 94 having the contacts referred to therein, conductor 218 connected with a common 220 of the switch 52 which is connected with alternate ones of the contacts in the switch. The switch includes another common 222 connected with the remaining contacts. The circuit through the relay 92 continues from the contact No. 1 of the switch to the arm 100 which is at that time in engagement therewith, then through conductor 102, the gate 104 and conductors 105 and 106 in return to the transformer.

Energization of the relay 92 as just described closes contacts 92e (center right) which energizes the rotor 47 of the stepping switch assembly 46; the circuit through the rotor is as follows, beginning with the rectifier 42, conductors 81, 178, 180, the rotor, switch 60, conductor 182, contacts 92e and conductor 88 in return to the rectifier.

It should be noted that the relay 186 (center right) is not energized in this step since it is controlled by the relay 93 which is at this time de-energized. Accordingly the normally closed contacts 186d (top right) are closed and the circuit is again set up through the transformer 20 (top right) as follows: the transformer 14s2, conductors 109, 110, 111, the abnormally closed contacts 92c, conductors 113, 199, 201, the resistor 62a between the first two contacts of the switch 50, then the arm 115 of the switch which is at that time in engagement with the No. 2 contact, conductor 63, contacts 80d conductor 114, the transformer 20 and then the conductor 44 in return to the transformer 14s2. The inclusion of the first resistor 62a of the switch 50 reduces the voltage of the transformer 20 an additional increment, which in the case assumed is approximately $\frac{1}{12}$ of the maximum voltage of the transformer. This reduced voltage, as in the case of the reduced voltage in the first step results in lesser current flow through the gates 24a and 24b (upper left) and correspondingly lesser maximum magnetism of the chuck. In this case as in the first step, when the magnetization of the chuck reaches a predetermined level, but at a lesser level than in the first step, a control signal is imposed on the gate 123 (center) through the same circuit beginning with the conductor 120 leading from the chuck circuit and terminating with the conductor 144 returning to the chuck circuit, except that in the switch 54 the resistor 66a is put in circuit since the arm 214 is in engagement with contact No. 2 of the switch. This additional resistor in the circuit produces a greater voltage drop and the control signal imposed on the gate 123 is delayed in effect. When however the gate 123 is rendered non-conducting, as in the first step, the circuit is broken through the relay 92 (top center) which at this time existed through the holding contacts 92b (adjacent thereto). Upon de-energization of the relay 92 the contacts 92c (top right) are opened, opening the circuit to the transformer 20 and thus de-energizing the AC–SCR SWITCHING STAGE 28 and opening the charging circuit to the chuck.

De-energization of the relay 92 additionally permits closure of the contacts 92f (center right) and establishes a circuit through the relay 186 (center right) as follows: from the rectifier 42, through conductors 81, 178, 188, 189, 190, the relay 186, conductors 192, 224, the contact 92f, conductor 226 which connects with a common 228 in the switch 56. The common 228 is connected with alternate ones of the contacts of the switch, and connection is made through the arm 86 which is at that time in engagement with contact No. 2. The circuit continues through conductors 87 and 88 in return to the rectifier 42. This circuit energizes the relay 186, but only after a delay due to the capacitor 196, and this closes the contacts 186e (top center) and again closes circuit to the relay 93, this circuit including conductor 230 connected with the common 222 of the switch 52, and thus with the arm 100 which is then in engagement with contact No. 2 of the switch. The circuit through this switch is completed as described above. Additionally, energization of the relay 186 (center right) closes the contacts 186b (top right) and with the closure of the associated contacts 93e, circuit is again completed to the transformer 20. Energization of the relay 93 (top center) again closes the contacts 93c (center right) and energizes the rotor 47 and steps the stepping switch assembly 46 to the next step.

The procedure is repeated as described above in connection with the first energization of the relay 93 (top center). The demagnetizating operation continues step by step with alternate energization of the relays 92 and 93 (top center), and corresponding alternate de-energization thereof throughout the total number of steps provided for by the stepping switch assembly 46, which in this case are twelve in number. At each step the voltage provided by the transformer 20 (upper right) is reduced with corresponding less current passing through the gates 24a and 24b (upper left) and a lesser degree of magnetism in the chuck 32. Also, in each step, additional resistors 66 in the switch 54 (center) are placed in circuit so that a control signal of lesser value is imposed on the gate 123 (center) and as a result, the control exerted on the relays 92 and 93 (top center) is exercised in a delayed condition.

One of the principal advantages of the invention results from this condition, namely, the actuation of the relays 92 and 93 is controlled directly by the condition of the chuck; a control signal for controlling those relays is developed according to the magnetism of the chuck, which may be rapid, or slow. A massive workpiece on the chuck requires a greater length of time for magnetization than a small workpiece, and if all other conditions affecting these two situations should be fixed, then the demagnetizing operation would not be efficient, nor in many cases effective. For example, if the demagnetizing steps were controlled solely according to the time element, a time interval established for a massive workpiece would be unnecessarily long for a small workpiece but on the other hand a time interval set for a small workpiece would be entirely ineffective for a large or massive workpiece. It will be understood that the conditions required for magnetizing and demagnetizing articles of different character are widely different. In this invention the element of time, as such, is eliminated in the demagnetizing steps. The present apparatus eliminates its requirement for judgment as to the character of the workpiece, or article to be magnetized and demagnetized, and an operator need not be skilled in this phase of the operation (although he would be skilled in the grinding operation).

Another important advantage of the invention is that a lesser voltage is imposed on the chuck in each succeeding step in the demagnetizing operation. As the level of magnetism decreases, it becomes increasingly difficult to control the demagnetizing step accurately, but the reduction of the rate of demagnetizing renders it possible to control that step more accurately. For example, in the last step, the level of magnetism is very low, in the present case approximately $\frac{1}{12}$ of the maximum, and the slower rate of demagnetizing, particularly in the last step thereof, makes it possible to bring the magnetism down to a level extremely close to zero, if not exactly zero.

The method of controlling the current developed by the transformer 14 for magnetizing the chuck produces a steady rate of that current in each step. In other words the current produced by the transformer 20 (upper right) under the control of the switch 50, is controlled as to the voltage thereof, and it produces a correspondingly controlled current which in turn accurately controls the gates 24a and 24b (upper left) so that a current is developed by the transformer 14 that is steady and of a predetermined value throughout each step.

The successions of steps in the demagnetizing operation continue with the relays 92 and 93 (top center) alternately being energized, and the last step takes place after the arm 100 of the switch 52 reaches contact No. 11. In that position the relay 93 is energized and pursuant thereto in a manner described above, the arm 100 is advanced to contact No. 12 which is the OFF or home position and the circuit is brought to its starting condition as represented in the drawing.

The green light 158 (bottom right) glows while the apparatus is in CHARGE position, the circuit therefor being as follows: from the rectifier 42 through conductors 81, 159, and 160, the contacts 74c which are then closed, the light, contacts 35b which are closed by the relay coil 35a (lower left) when the chuck is magnetized in accordance with the polarity of that magnetism in the CHARGE condition of the apparatus; the circuit continues through conductor 161, 84, abnormally closed contacts 80c, and then through conductor 85, the arm 86 of the switch 56 and conductors 87 and 88 in return to the rectifier.

The apparatus provides for a RESIDUAL phase in which the chuck and workpiece thereon can be brought down to a minimum of magnetism for the purpose of removing the workpiece to test it to determine whether additional operation should be performed thereon. The RESIDUAL phase may be achieved only from the CHARGE condition of the apparatus. To place the apparatus in RESIDUAL phase, the operator sets the knob 70 (FIGURES 2 and 3) in RESIDUAL position, or to the left of center as shown in those figures. In such position the switches 75a (bottom) 75b (lower right) and 75c (lower right) are closed, the green signal light 158 (lower right) will be glowing when the apparatus in in CHARGE position and this will signal to the operator that he may place it in RESIDUAL condition. Switching the knob 70 to the RESIDUAL position, opens the contacts 74c (as well as the contacts 74a and 74b) and selects the amber signal light 232 but the light will not be ignited until the RESIDUAL cycle is completed. After the knob 70 is so set, the operator depresses the CHARGE pushbutton 78 (FIGURES 2 and 4) and upon consequent closure of the contacts 78b thereby (FIGURES 1A, 1B, bottom right) a circuit is established through relay 93 (top center) as follows: transformer 22s1, conductors 90 and 230, the relay 93, contacts 92d, conductors 171, 234, contacts 35c (lower right), contacts 75b, conductor 236, the CHARGE switch 79b, conductor 254 including contacts 80b, conductor 98, the arm 100 in the switch 52, conductor 102, gate 104, and conductors 105 and 106 in return to the transformer 22s1. Upon thus energizing the relay 93, it retains itself through holding circuit contacts 93b and the relay will energize the relay 186 (right center). This closes the contacts 186b (top right) which together with the contacts 93a in series therewith, energizes the transformer 20 as described above. This then energizes the transformer 14s1 which then energizes the DC circuit 30 and magnetizes the chuck, but in the opposite polarity than before, through the abnormally closed contacts 186e and 186f. This reverse polarity will then reverse the polarity of the relay 35 (lower left) which will be unlatched when the current build-up is sufficient to de-energize the relay 93 (top center) as described above in the first step of the demagnetizing operation. The de-energization of the relay 93 enables the contacts 35d (lower right) to close, thus closing the circuit to the amber light 232 which indicates that the magnetism of the chuck has reached a minimum value approaching zero.

The circuit for imposing the control voltage on the relay 93 by the chuck is derived from the DC circuit from the conductor 37 thereof to conductors 120, 122, the gate 123, conductors 128, and 130, 132, 133, 134, 135, 136, 258, adjustable resistor 240, conductor 242, the contacts 75a, conductors 139, 140, contacts 80e and conductors 141, 142, 143, 144 in return to the conductor 38 of the DC chuck circuit 30.

The adjustable resistor 240 (bottom center) enables a bias to be imposed on the gate 123 (center) to de-energize the relay 93 (top center) when the level of magnetization in the chuck is at or closely adjacent to zero.

When this magnetization reaches zero, the relay 35 (bottom left) in the chuck circuit also becomes de-energized and enables the contacts controlled thereby to assume their normal positions. De-energization of the relay 93 (top center) opens the circuit to the chuck, as explained above, by allowing the contacts 93e (top right) to open.

The apparatus also provides for imposing VARIABLE holding power on the chuck. The purpose of this arrangement is to selectively impose a desired holding power less than the full holding power, according to the circumstances encountered in each installation. For example, in a VARIABLE setting, the level of magnetism does not reach the level of full CHARGE position. A manual adjusting knob 242 (FIGURE 2) is provided for adjustably setting an adjustable resistor 244 (FIGURES 1A and 1B, bottom center) in the VARIABLE circuit. The circuit may be designed for providing a maximum holding power under VARIABLE to be any desired predetermined value or proportion of the full CHARGE holding force, such for example as 60%. When the knob 242 is set at its maximum setting the VARIABLE holding power imposed on the chuck will be 60% of the maximum holding power in CHARGE position, i.e., when the knob is set at the hundred points indicated, a RESIDUAL power of 60% will result. The knob may be set at any setting between zero and one hundred with a corresponding portion of RESIDUAL power relative to the 60% of the maximum holding power of the CHARGE setting.

The VARIABLE position of the apparatus may be obtained from demagnetized or released position, which is indicated by the glow of the red signal light 168 (bottom right). The operator sets the knob 70 (FIGURE 3) to VARIABLE position, or to the right as viewed in FIGURES 2 and 3. This position closes the contacts 76a, 76b, and 76c shown in FIGURE 3 and also shown in the circuit of FIGURES 1A and 1B at bottom center, bottom right, and bottom right, respectively. Closure of the contacts 76c places a white signal light 246 (bottom right) in circuit as follows: from the rectifier 42, (upper right) through conductors 81, 159, and 248, the contacts 76c, conductor 250, normally closed contacts 35d, it being recalled that the chuck is in demagnetized position, then through conductor 161, contacts 80c, conductor 85, the arm 86 of the switch 56, and conductors 87 and 88 in return to the rectifier.

In this step, the operator depresses the pushbutton 78 closing the contacts 79b (bottom right) which closes a circuit through the relay 93 (top center) as follows: from the transformer 22s1, conductor 90, conductor 170, the relay 93 normally closed contacts 92d, conductors 171, 172, 252, the contacts 76b, conductor 236, the contacts 79b, conductor 254, abnormally closed contacts 80b, conductor 98, the arm 100 of the switch 52, conductor 102, the gate 104, and conductors 105 and 106 in return to the transformer. The relay 93 as thus energized, closes contacts 93d (center right) and energizes the relay 186 as described above, and the latter reverses the switches 31 in the chuck circuit. Also, energization of the relay 186 closes contacts 186b (top right) which with the abnormally closed contacts 93e in series therewith energizes the transformer 20 as described above which in turn energizes the transformer 114 and magnetizes the chuck. The relay 35 in the chuck circuit will not be energized because relay 36 (center right) will be energized and prevent the relay 35 from latching. When the current builds up in the chuck, a voltage will be impressed on the gate 123 (center) as described above and when it reaches a predetermined value, according to the setting of the adjustable resistor 244 (bottom center) the gate 123 will be shut off and the relay 93 de-energized.

The circuit controlling the gate 123 in VARIABLE is similar to that in CHARGE and RESIDUAL except that it includes a conductor (bottom center) instead of the conductors 138 or 242, the resistor 244 instead of the resistors 240 or 137, and conductor 256.

The apparatus is designed for use with magnetic chucks of various sizes and wattage capacities. The control resistor 39 in the chuck circuit is initially set according to the wattage of the chuck. This provides a control signal means for controlling the entire cycle of the apparatus, the signal being utilized in the CHARGE, RESIDUAL, VARIABLE and DEMAGNETIZING portions of the cycle. Other adjusting means are included for making appropriate adjustments according to the characteristics of the chuck, including the adjustable resistors 137 and 240 referred to above and which are adjustable between LOW and HIGH positions. Also included are resistors 258 and 260 (bottom right) in the VARIABLE position circuit, representing LOW and HIGH respectively, and each being adjustable in itself between LOW and HIGH positions.

The apparatus is effective for demagnetizing the chuck in the number of steps indicated, in this case twelve, regardless of the level of magnetization of the chuck. It will be appreciated that the characteristics of the load, i.e., the workpiece 33, will effect the magnetization of the chuck, e.g., the greater the size and mass of the workpiece, generally speaking, the greater will be the force required for demagnetizing it, and the apparatus in proceeding through its demagnetizing operation will demagnetize the chuck and workpiece in the number of steps indicated with proportionate demagnetization taking place in each of the steps, regardless of the mass or other characteristics thereof. Accordingly the apparatus is extremely flexible in its operation, being adaptable to an extremely wide range of characteristics of chucks and workpieces held thereby.

While I have disclosed a preferred form of the inven-

I claim:

1. Apparatus for controlling the condition of magnetism of an article comprising, means for demagnetizing the article in a series of steps in which the demagnetizing current is reduced successively in the steps, and the current is maintained at a steady value throughout each step.

2. The invention set out in claim 1 wherein the apparatus includes means for selectively magnetizing the article, and demagnetizing it as stated.

3. The invention set out in claim 1 wherein the demagnetizing means includes means controlled by the level of magnetism of the article for controlling the value of the current imposed thereon in each step.

4. The invention set out in claim 1 wherein the apparatus includes a circuit incorporating the article and also incorporating control transistors, a control circuit for controlling the transistors and thereby controlling the first circuit, and means for controlling the control circuit for reducing the current in the first circuit as stated.

5. The invention set out in claim 4 wherein the transistors are operative for performing switching operations in the first circuit and the control circuit is operative for imposing controlling bias on the transistors for performing the switching operations, and control means is provided for controlling the control circuit for reducing the current in the first circuit as stated.

6. The invention set out in claim 5 wherein said control means includes stepping means, and means is provided responsive to the level of magnetism of the article for controlling the stepping means.

7. The invention set out in claim 1 wherein the apparatus includes means for selectively magnetizing the article, and demagnetizing it as stated, a normally open circuit adapted for connection with a source of supply and including the article, a control circuit for closing the first circuit, and means responsive to the level of magnetism of the article for controlling the control circuit and thereby opening the first circuit.

8. Apparatus according to claim 1 including a first AC circuit including back-to-back transistors therein for performing switching operations in the circuit, a rectifier connected with the AC circuit, a DC circuit leading from the rectifier to the article, a control circuit for rendering the transistors conducting and thereby closing the AC circuit, reversing means in the DC circuit, and means controlled by the level of magnetism in the article for controlling the control circuit throughout said series of steps and to thereby reduce the current in the AC circuit successively in those steps, said control circuit also being operative for actuating the reversing means in successive ones of the steps.

9. Apparatus according to claim 8 wherein the AC circuit is normally open, the control circuit includes transformer means, and including means for reducing the effective voltage of the transformer means successively in a series of steps corresponding to the first mentioned series of steps, stepping means for reducing the effective voltage of the transformer means as imposed on the transistors and means responsive to the level of magnetism of the article for operating the stepping means.

10. The invention set out in claim 9 wherein the stepping means includes a plurality of resistors in series, and the stepping means is operative for placing a progressively greater number of resistors in the control circuit in successive ones of said steps whereby to reduce the voltage of the control circuit.

11. Apparatus according to claim 1 including means for selectively magnetizing the article, and demagnetizing it as stated, a normally open AC circuit including switching means therein, a rectifier connected with the AC circuit, a DC circuit leading from the rectifier to the article, a control circuit including transformer means operative for actuating said switching means in the AC circuit, stepping means including a plurality of resistors in series and in successive steps operative for placing increasing numbers of the resistors in circuit with the transformer means and thereby effectively reduce its effective voltage in successive ones of the steps, the transformer means due to its reduced voltage being operative for rendering the switching means conductive in successive steps in such manner as to reduce the current flowing through the AC circuit and DC circuit to the article, and means responsive to voltage drop across the chuck for actuating said stepping means, and means under control of said stepping means for reversing the DC imposed on the article in successive steps.

12. Apparatus according to claim 1 in conjunction with said article and wherein the article includes a permanent magnet.

13. Apparatus according to claim 12 including means for selectively magnetizing the article, and demagnetizing it as stated, and means responsive to the level of magnetism of the article for interrupting the magnetizing means.

14. The invention set out in claim 1 wherein the apparatus includes means for selectively magnetizing the article and demagnetizing it as stated, the article includes a permanent magnet chuck, the apparatus also including a normally open AC circuit including back-to-back transistors, a rectifier connected with the AC circuit, a DC circuit leading from the rectifier to the chuck, a control circuit including transformer means operative for rendering the transistors conducting in alternate halves of cycles of the AC and thereby closing the AC circuit, a control circuit including transformer means operative for imposing control bias on said transistors, the demagnetizing means including a stepping means for reducing the effective voltage of the transformer means for rendering the transistors conducting at successively lesser intervals in successive steps whereby to successively reduce the current in the AC and DC circuits imposed on the chuck, and means for rendering said transformer means inoperative at each step, said last means being responsive to the voltage drop across the chuck.

15. Apparatus according to claim 1 including means for selectively magnetizing the article and demagnetizing it as stated, a first circuit adapted for connection with a source of supply for magnetizing the article, a control circuit operative for closing and opening the first circuit, means responsive to the voltage drop across the article for controlling the control circuit and operative for interrupting the control circuit and re-establishing it throughout a series of steps, and means for terminating the steps according to the condition of magnetism of the article and independently of time.

16. Apparatus according to claim 1 in conjunction with an article including a permanent magnet chuck, and wherein the apparatus includes a first circuit incorporating the chuck, a control circuit for controlling the first circuit, transistor means for controlling the control circuit, and means responsive to voltage drop across the chuck for imposing a control bias on the transistor means so thereby interrupting the control circuit for terminating magnetizing operation on the chuck.

17. Apparatus of the character disclosed comprising a permanent magnet chuck, means for magnetizing the chuck and means for demagnetizing the chuck in a series of steps, means responsive to the level of magnetism in the chuck for terminating the magnetizing step, means responsive to the level of magnetism of the chuck for effecting the demagnetizing operation, and adjustable means for predetermining the level of magnetism at which the demagnetizing operation is effective.

18. Apparatus according to claim 17 wherein the first circuit means is adapted for connection to a source of supply and operable for imposing direct current on the chuck, the control circuit is operable for energizing the first circuit for thereby magnetizing the chuck to a predetermined level of magnetism, control means is provided for controlling the first circuit for imposing DC on the chuck in a first and second step, in which the polarity in the second step is opposite that in the first step and adjustable means is provided for predetermining the level of magnetism imposed on the chuck in the second step, and means is provided responsive to the chuck as magnetized in the second step for de-energizing the first circuit means.

19. The invention set out in claim 18 wherein manually adjustable means is provided for selectively predetermining the level of magnetism of the chuck in the second step at which the demagnetization occurs.

20. Apparatus according to claim 17, including a first circuit adapted for connection to a source of supply and operative for imposing DC on the chuck, a control circuit for energizing the first circuit, means responsive to the magnetization of the chuck reaching a predetermined level for controlling the control circuit and thereby de-energizing the first circuit, said last means having a normal step and operative for effecting magnetization at a full value, additional control means operative in response to the magnetism of the chuck reaching a predetermined level for controlling the control circuit and thereby de-energizing the first circuit, said additional control means being manually adjustable for selectively setting the value of the magnetism of the chuck at which the second step occurs.

21. The invention set out in claim 18 wherein means is provided responsive to magnetism of the chuck for de-energizing said additional control means whereby it is rendered active only when the chuck is demagnetized.

22. Apparatus according to claim 17 including a first circuit adapted for connection with a source of supply and operative for imposing DC on the chuck, manually actuable means for energizing the first circuit and thereby magnetizing the chuck, first control means responsive to the level of magnetism of the chuck for de-energizing the first circuit in a CHARGE position, second manually operable means for energizing the first circuit for magnetizing the chuck, second control means responsive to the level of magnetism in the chuck for de-energizing the first circuit, manually adjustable means for controlling the second control means for predetermining the setting and controlling the operation of the control means at a predetermined level of magnetism of the chuck, and means operative in response to the magnetism of the chuck for rendering inoperative said second manually controlled means.

23. The invention set out in claim 1 wherein the apparatus includes means for selectively magnetizing the article, and demagnetizing it as stated, means responsive to the condition of magnetism of the chuck for controlling the demagnetizing operation, said last means being operative for so controlling the demagnetizing operation in the same number of steps independently of the level of magnetism of the chuck.

24. Apparatus according to claim 17 in which the first circuit means includes a first circuit portion adapted for connection with an AC source and a second circuit portion including the chuck and a rectifier operatively interconnecting the circuit portions for imposing DC on the chuck, and wherein the apparatus includes reversing switch means for reversing the polarity of the DC imposed on the chuck, cycling means, a first relay, a second relay, manually settable CHARGE control means operative upon actuation thereof for energizing the first relay, means controlled by the first relay for energizing the first AC circuit portion for thereby imposing DC on the chuck and magnetizing the chuck, means responsive to the level of magnetization of the chuck for de-energizing the first relay, manually settable DEMAGNETIZE control means operative upon actuation thereof for energizing the second relay, the second relay being operative upon energization thereof for operating the cycling means, the cycling means being operative upon actuation thereof for alternately reversing said reversing switch means and simultaneously therewith respectively alternately actuating the two relays, and means controlled by the cycling means for reducing the current imposed on the chuck successively in the alternations of the reversing switch means and the relays to a point closely adjacent zero magnetism of the chuck.

25. The invention set out in claim 24 wherein the cycling means includes stepping means having a predetermined number of steps, and also includes a plurality of resistors placed in series with the chuck in successively greater numbers in successive ones of said alternations.

26. A method of controlling magnetism of an article comprising passing DC through the article in a series of steps, in which the DC is of alternately opposite polarity in successive steps, and maintaining the DC of steady value throughout each step.

27. The method set out in claim 26 including magnetizing the article to a predetermined level of magnetism and thereafter demagnetizing it as stated.

28. The method set out in claim 27 including utilizing the level of magnetism of the article for predetermining the value of the DC in the demagnetizing steps.

29. The method set out in claim 26 including magnetizing a plurality of articles to various levels of magnetism, and demagnetizing them each in the same number of steps.

References Cited
UNITED STATES PATENTS 2,229,104   1/1941   Littwin _____ 317—157.5

LEE T. HIX, *Primary Examiner.*